United States Patent
Kedem

[19]

[11] Patent Number: 6,154,853
[45] Date of Patent: *Nov. 28, 2000

[54] METHOD AND APPARATUS FOR DYNAMIC SPARING IN A RAID STORAGE SYSTEM

[75] Inventor: Ishai Kedem, Brookline, Mass.

[73] Assignee: EMC Corporation, Hopkinton, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,164

[22] Filed: Mar. 26, 1997

[51] Int. Cl.[7] .................................................. G06F 11/00
[52] U.S. Cl. ............................................. 714/6; 711/114
[58] Field of Search ..................... 395/182.04, 182.03, 395/182.05, 182.02, 894; 371/21.6, 40.2; 714/723, 764, 6, 5, 7, 4; 710/74; 711/114

[56] References Cited

U.S. PATENT DOCUMENTS

| | | |
|---|---|---|
| 4,899,342 | 2/1990 | Potter et al. . |
| 5,166,936 | 11/1992 | Ewert et al. ............................ 371/21.6 |
| 5,202,979 | 4/1993 | Hillis et al. . |
| 5,313,626 | 5/1994 | Jones et al. ........................ 395/182.03 |
| 5,390,187 | 2/1995 | Stallmo ............................... 395/182.05 |
| 5,504,882 | 4/1996 | Chai .................................. 395/182.03 |
| 5,526,482 | 6/1996 | Stallmo et al. ..................... 395/182.04 |
| 5,542,065 | 7/1996 | Burkes et al. ........................... 711/114 |
| 5,579,475 | 11/1996 | Blaum et al. ...................... 395/182.05 |
| 5,611,069 | 3/1997 | Matoba et al. .......................... 711/114 |

OTHER PUBLICATIONS

P. Chen, E. Lee, G. Gibson, R. Katz and D. Patterson, RAID High–Performance, Reliable Secondary Storage, Jun. 1994.
D. Patterson, P. Chen, G. Gibson and R. Katz, Introduction to Redundant Arrays of Inexpensive Disks (RAID), 1989.
P. McLean, An Introduction to RAID, Redundant Arrays of Inexpensive Disks, Apr. 24, 1991.
EMC Intros Products & Features for Mainframs RAID, Newbytes, Apr. 18, 1995.
EMC Introduces New Raid Level for Symmetrix Family RAID–S: The Highest Performance Parity–Based RAID, Press Release, Apr. 17, 1995.

*Primary Examiner*—Emmanuel L. Moise
*Attorney, Agent, or Firm*—John M. Gunther, Esq.; William R. Clark, Esq.

[57] ABSTRACT

A method of dynamically changing a storage system from a RAID configuration to a mirror configuration is provided. The change occurs when a device begins to fail or fails completely. Data from the logical volumes of the failed device is written to corresponding parity volumes within the RAID group. In addition, data from all logical data volumes is copied to spare devices. Once all the data is copied, the system operates in a mirrored mode. A mirrored mode includes writing data to both and active and backup volume for each write transaction. When the failed device is replaced the data and parity volumes are restored. Once restored, the spare devices are returned to inactive status.

10 Claims, 6 Drawing Sheets

METHOD AND APPARATUS FOR DYNAMIC SPARING IN A RAID STORAGE SYSTEM

BACKGROUND OF THE INVENTION

This invention relates generally to storage systems associated with computer systems and more particularly to providing a method and apparatus for providing a dynamic sparing in a RAID storage system. That is, the method and apparatus provide a means for dynamically converting a storage system from a RAID configuration to a mirrored configuration.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One type of storage system known in the art is one which includes a number of disk storage devices configured as an array (sometimes referred to as a RAID array). Such a system may include several arrays of storage devices and thus provide storage services for many host computers. Alternately, a single storage system may store massive amounts of data for a single host computer or even a single application program. With such systems often there is a need and expectation that the data stored on the disk devices of the storage system be available twenty four hours a day, seven days a week. Such a requirement places a heavy burden on the storage system in terms of reliability.

One method of achieving reliability is through the use of various RAID configurations. In at least one RAID configurations, part of the available storage capacity within a storage system is used to store parity information. The parity information may be generated using the stored data. The data may be spread across several disks with the parity information residing on yet another disk. The data and associated parity storage are typically known as a RAID group. With this arrangement, data associated with a failing or failed disk device may be constructed using the remaining data and the parity information. One of the drawbacks of such a system is the increased processing time to maintain the parity information for each transaction. Another drawback is the loss of storage capacity due to the storage of the parity information.

Another method of achieving reliability it to provide a local or remote mirror of each storage device within the system. With such an arrangement, each time the host writes to the storage system, the data is stored in an active and a backup storage device. Should one of the active devices fail, the backup device may be seemlessly substituted thus providing uninterrupted service. One of the drawback of the mirroring solution is the additional storage devices required to provide the mirroring function.

Yet another method of providing storage system reliability is through the use of so called dynamic sparing. Dynamic sparing may be thought of as a cousin of the mirror solution in that a complete copy of a failed device is substituted for the failed device. The difference between sparing and mirroring is that with a sparing solution, data is not always written to both the active and backup storage devices. Dynamic sparing operates by sensing when a particular storage device is beginning to fail. Failure may be indicated if a particular device begins to report an unacceptable amount of I/O errors. When this condition is sensed by the storage system, it begins copying all data from the failing device to a backup device. The backup device, which has been idle until this point, will then replace the failing drive when all data is copied. Thus, potential storage system unavailability may be avoided.

Storage system customers typically choose one of the above schemes for achieving some level of fault tolerance. A drawback with each of the reliability solutions described above is that until the failed device is repaired or replaced, the storage system will typically be left operating in a state where no additional failures may be tolerated. That is, if a second device were to fail before the first failing device were replaced, the data would no longer be available to the host computers. This level of uncertainty may not be acceptable when critical data is being stored within a storage system.

SUMMARY OF THE INVENTION

In accordance with the present invention, a storage system is provided which provides multiple levels of fault tolerance. The fault tolerance is achieved by enabling the storage system to dynamically convert from a RAID configuration (with parity) to a mirrored configuration without disrupting storage services. The system includes an array of disk drives configured to operate as a RAID with parity. The system also includes a number of spare storage devices. The number of spare devices provided is an amount necessary to store all of the data from the data volumes of the storage array. In the event of a failure in one of the storage devices, data from the data volumes of the failing device is copied to the parity volumes associated with the failing device. In addition, all of the data from the data volumes, including data from the non-failing devices, is copied to the spare devices. When all of the data is copied, the system is operated in a mirror configuration with no parity being maintained for the data volumes. Instead, the data in each data volume is mirrored in a spare device. Once the failed drive is replaced, the RAID groups are re-established by copying the data from the old parity volume to the new device. The parity information is then generated and stored in the appropriate parity volumes. Once complete, the spare drives return to an inactive state. With such an arrangement, multiple device failures may be tolerated within the storage system without loss of data or interruption of storage services.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
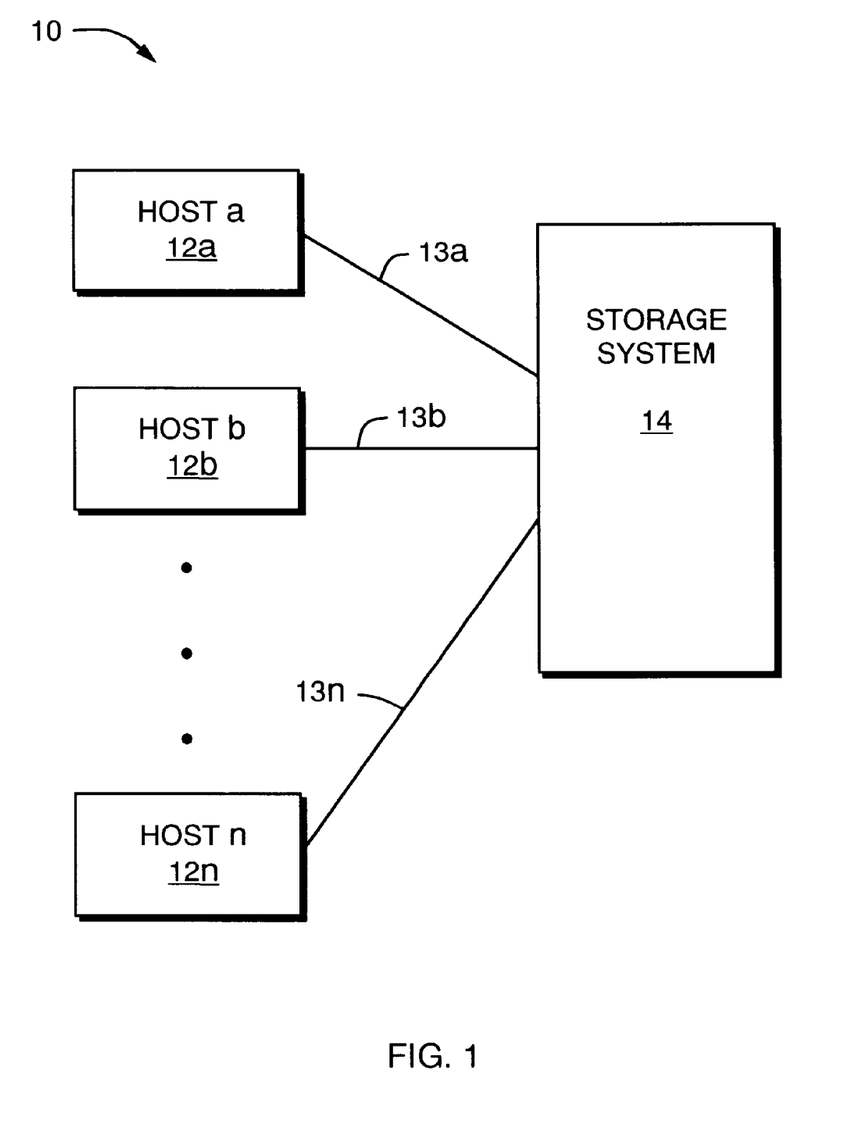
FIG. 1 is a block diagram of a computer system including a mass storage system incorporating the present invention.

Referring now to FIG. 1, computer system 10 is shown to include, among other things, a plurality of host computers 12a–12n, coupled to a storage system 14 via communication paths or busses 13a–13n respectively. The host computers may each be any of a well-known type of computer system. For example, host 12a may be a mainframe computer or may be an open-systems computer or alternatively may be a personal computer. Since each of the computer systems just mentioned typically communicates using a specific communication protocol, buses 13a–13n will correspondingly be those buses specific to the computer system to which they are coupled.

Figure 2:
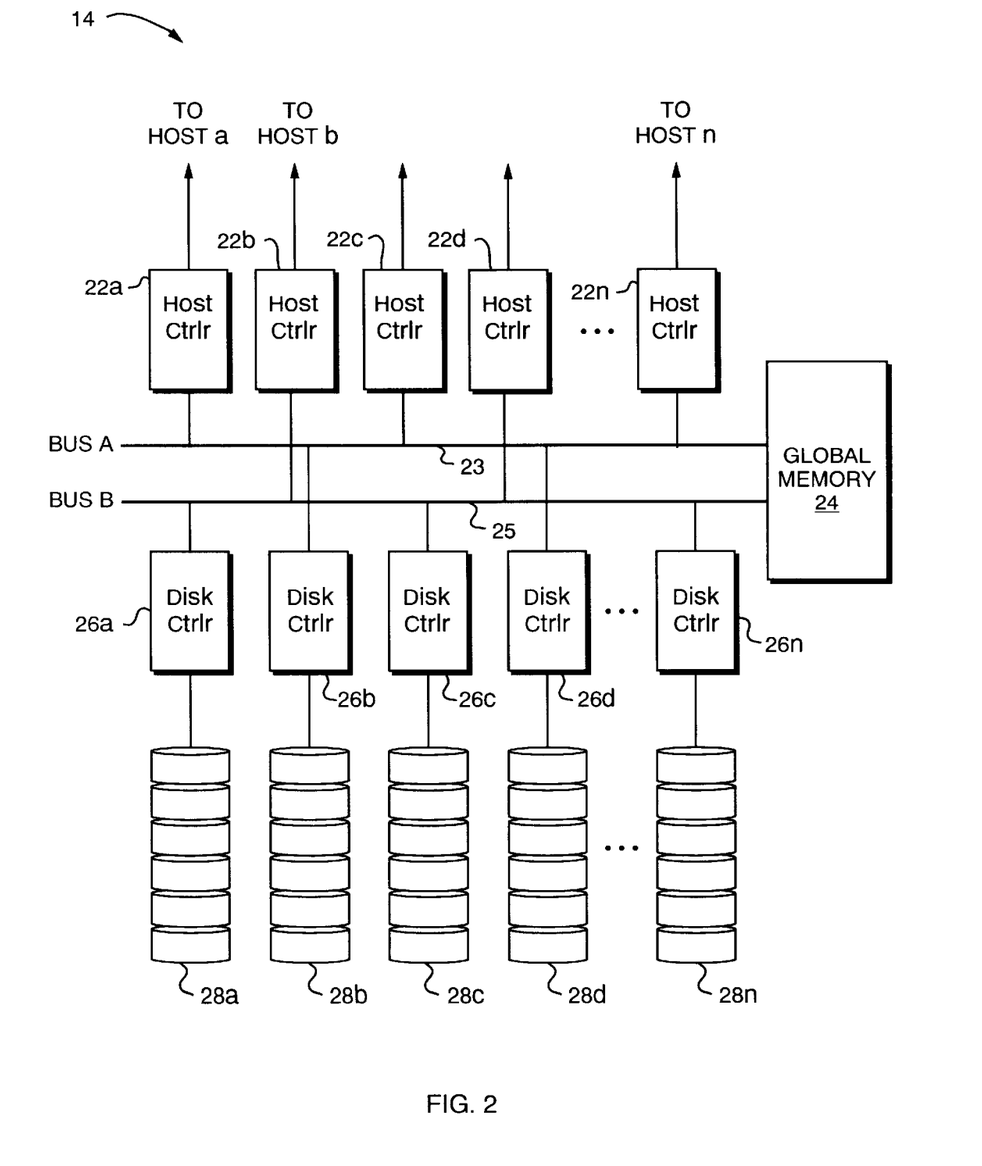
FIG. 2 is a diagrammatic representation of the storage system of FIG. 1.

Referring now to FIG. 2, storage system 14 of FIG. 1 is shown in more detail to include a plurality of controllers and disk drives all interconnected by two buses 23 and 25 which are further coupled to a global memory 24. Among the plurality of devices coupled to buses 23 and 25 are host controllers 22a through 22n. Each host controller provides interface from one or more host computers into the storage system 14. According to a preferred embodiment of the present invention, a host computer would communicate with storage system 14 by sending a request over an associated bus to one of the controllers 22a–22n. The controller would interpret the request from the host computer and send the appropriate request to one of the disk controllers 26a through 26n. Here the request from host controller to disk controller is channeled through the global memory 24. That is, for example, if the host controller received a request from a host computer and the request was for a read of data from one of the arrays 28a through 28n coupled respectively to disk controllers 26a through 26n, the host controller would first look to the global memory to see if the data desired by the host was resident in the global memory. If the data was not resident in global memory, the controller would place a request in a queue in global memory. The request would be serviced by the appropriate disk controller 26a through 26n by delivering the data from the respective disk array into the global memory. Once the data is delivered to the global memory by the disk controller, the requesting host controller would retrieve the data from the global memory and deliver it to the requesting host. Similarly, for data write operations, a host controller would place the data being written by the host computer into global memory 24. The host controller may then send an acknowledge signal back to the host computer indicating that the data had been written out to the appropriate drive. Some time later the appropriate disk controller would retrieve the data from global memory and write it to the appropriate disk of disk arrays 28a through 28n. According to a preferred embodiment, the data would also remain in the cache until displaced by according to the cache replacement protocol.

According to a preferred embodiment of the present invention and as will be discussed in detail below, disk arrays 28a through 28n are here configured in a RAID configuration. That is, each of the disks of disk arrays 28a through 28n may be partitioned into several logical volumes. To achieve a certain level of RAID protection, data may be striped across several logical volumes of the separate disks included in a particular disk array. A last logical volume on yet another disk may then be used to store parity information corresponding to the data stored on the other logical volumes of the other disks. Such a configuration results in what is commonly known as RAID groupings. With such a configuration, should one of the physical devices fail, the data may be reconstructed using the data from the remaining logical volumes of the RAID group in combination with the parity information. In addition to the RAID configuration of arrays 28a through 28n and according to the present invention, several of the disk devices included in arrays 28a through 28n may be designated as spare devices. As will be discussed in detail below, a spare device typically remains inactive during normal operation of the storage system 14 and may be activated in the event of a failure of one of the physical devices of arrays 28a through 28n.

In accordance with the present invention, a method is here provided in which a plurality of storage devices configure as one or more RAID groupings, are dynamically reconfigured into a so-called mirror configuration. As describe previously, a mirror configuration is a configuration in which a duplicate storage device is maintained for each device of a particular set of storage devices.

Figure 3:
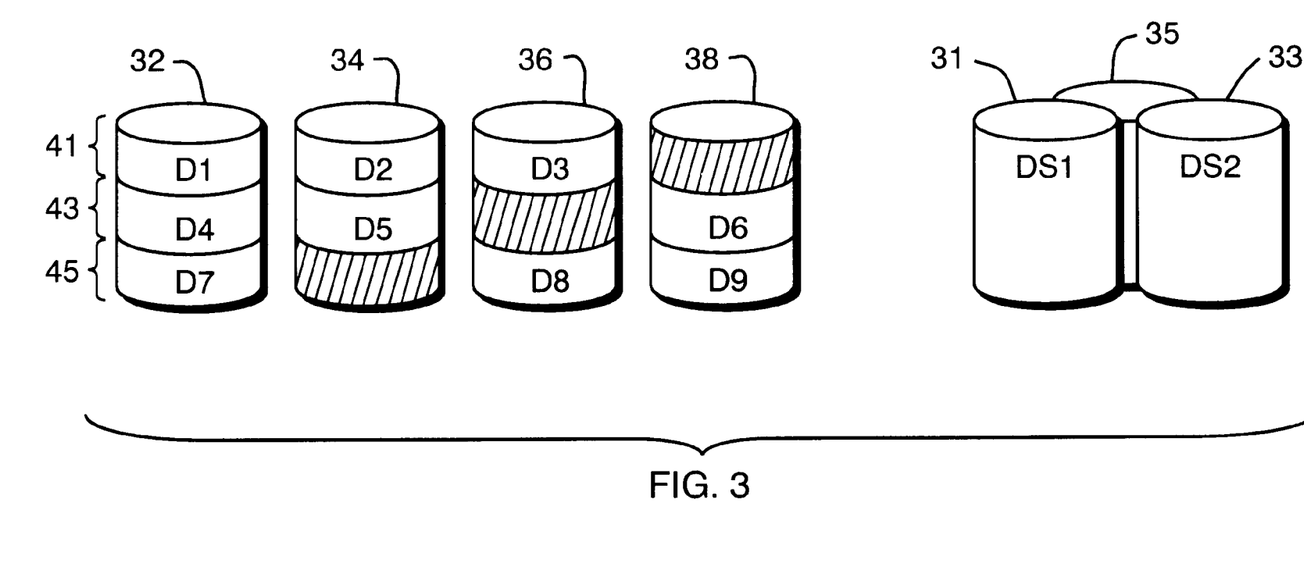
FIG. 3 is an illustration of a RAID array with accompany spare drives.

Referring now to FIG. 3, a plurality of disks arranged according to the present invention are shown. For simplicity only four storage devices 32, 34, 36 and 38 are shown as being part of the active set of storage devices. Additionally, devices 31, 33 and 35 are the spare devices used according to the present invention. Here for simplicity of explanation each device includes only three logical volumes. That is for example, device 32 includes logical volumes D1, D4 and D7. Additionally, three of the drives 34, 36 and 38 include a logical volume which is dedicated to storing parity information. This results in the four drives 32, 34, 36 and 38 producing three RAID groups 41, 43 and 45. RAID group 41 includes logical volume D1 of device 32, logical volume D2 of device 34, and logical volume D3 of device 36 for storing data. In addition, RAID group 41 includes a logical volume from device 38 for storing the parity information corresponding to the data stored in logical volumes D1, D2 and D3 of devices 32, 34 and 36 respectively. Similarly, RAID group 43 includes logical volume D4 of device 32, logical volume D5 of device 34 and logical volume D6 of device 38. Here the parity logical volume is one of the logical volumes of device 36. Lastly, RAID group 45 includes logical volume D7 of device 32, logical volume D8 of device 36 and logical volume D9 of device 38. Here the parity volume corresponding to RAID group 45 is found on device 34. By configuring the devices 32, 34, 36 and 38 in such a manner with the parity volumes distributed across different physical devices any one of physical devices 32, 34, 36 and 38 may fail and the data may be reconstructed using the remaining logical volumes and the associated parity volume.

Note that in FIG. 3 there are only three spare devices 31, 33 and 35 associated with the four devices 32, 34, 36 and 38. The reason for the difference in numbers is that using a mirror redundancy scheme does not require the use of parity in order to reconstruct lost data. As such the parity logical volumes would not be stored on a spare device. When eliminating the parity volumes from devices 32, 34, 36 and 38 it becomes readily apparent that only three physical devices 31, 33 and 35 would be needed to provide equivalent data storage for the data in devices 32, 34, 36 and 38. It should be understood that the concepts to be described below are applicable to a much larger set of storage devices with many more logical volumes per device and thus are only limited by the physical constraints of the overall storage system.

Figure 4:
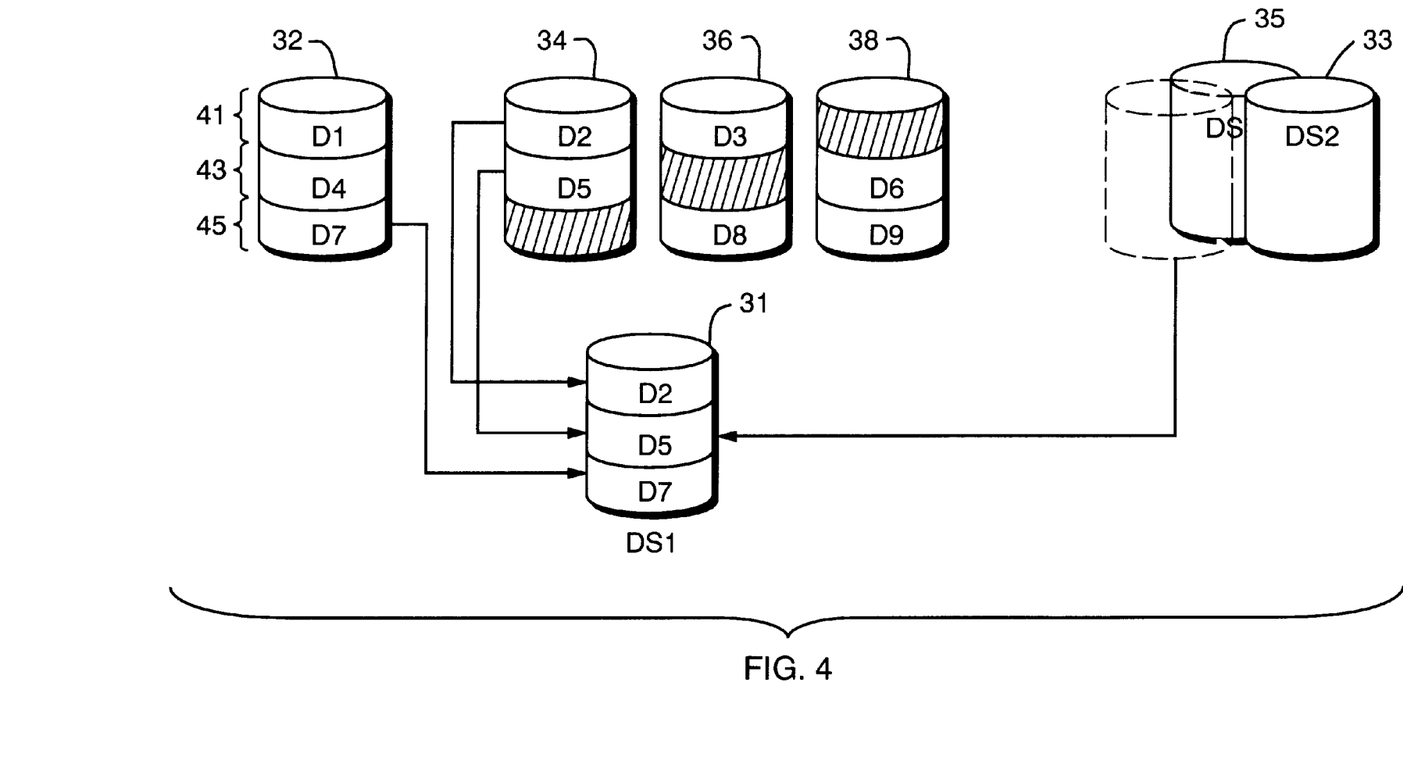
FIG. 4 is an illustration of the process for dynamic sparing for a failing device according to the present invention.

Referring now to FIG. 4 and according to one aspect of the present invention. Spare device 31 is shown as replacing device 34 which has here been identified by storage system 14 (FIG. 2) as entering a failing state. That is, if the storage system determines that device 34 is beginning to experience too many input/output errors in response to requests for reads or writes of data, the storage system according to the present invention will then begin writing the data from the failing device to one of the spare devices within the system. As shown in the FIG., device 34 has begun to fail and when that is sensed by the storage system, all the data from logical volume D2 of device 34 will be copied to a corresponding logical volume D2 of device 31. Additionally, all of the data from logical volume D5 of device 34 will be copied to a corresponding logical volume D5 of device 31. Since as described above, parity is not used in a mirroring scheme, the parity volume of device 34 will not be copied to spare device 31. Instead, the storage system will find the first logical volume of the next RAID group, here RAID group 45, and copy that data onto spare device 31. Thus for example, here data from logical volume D7 of device 32 will be copied to spare device 31. In order to provide complete protection for the data stored in the remaining devices 32, 36 and 38, the remaining data from logical volumes D1, D4, D3, D6, D8 and D9 will be copied to the spare devices 33 and 35.

After the mirror volumes have been created from the spare devices, the storage system will continue to operate in RAID mode while also maintaining mirror copies in the spare devices 31, 33 and 35. However, according a preferred embodiment of the present invention, should the number of I/O errors exceed a second threshold level, the data volume (e.g. volume D2) may be placed in a so-called write disable state. When the volume has been placed in a write disable state, write requests from the hosts will no longer be directed to the data volume D2. Instead, the data will be written to the corresponding parity volume, here the parity volume of device 38. Although volume D2 was placed in a write disable state, read requests for data stored on volume D2 will still be delivered from D2, if possible, and as long as the data has not previously been written to the parity volume.

Should device 34 begin reporting or pass a threshold for read errors, then the device will be taken off line by the storage system. If device 34 is taken off line, then the data of data volumes D2 and D5 will be reconstructed from volumes D1,D3 and D4, D7 respectively along with the parity volumes of devices 36 and 38 respectively. As each section (e.g. block, track, cylinder, etc.) is reconstructed, it will be written to the respective parity volume, replacing the associated parity data. The reconstruction process will continue until all the data from the failed device is copied to the parity volumes of the non-failing devices. As will be described in more detail below, should device 34 fail completely before the data in volumes D2 and D5 can be copied to the corresponding spare devices, the data from volumes D2 and D5 will be reconstructed from the associated data volumes and parity volumes of the respective parity groups. As the data is reconstructed, it will be copied to the spare device as well as the parity volumes as described above.

The results of copying data from failed device 34 to parity volumes of devices 36 and 38 and copying the data of devices 32, 36 and 38 to spare devices 32 and 35 is a complete transition from a RAID protection scheme to a mirror protection scheme. With this arrangement, the failure of more than one device may be tolerated in storage system 14 without any interruption in data delivery or storage.

That is, referring back to FIG. 3, assuming that none of the spare devices 31, 33 or 35 were available and that device 34 had begun to fail or failed completely, data would still be available by using the remaining devices 32, 36 and 38 to reconstruct the data. This would be done using the data in logical volumes D1 and D3 along with the parity volume on device 38. Note however that if any of the remaining drives were to fail in the system before device 34 were replace and its data reconstructed, none of the data within devices 32, 34 and 36 or 38 would be available for either reading or writing. Additionally, there would be no way to reconstruct the data. This would amount to a total loss of the data corresponding to those storage devices.

Figure 6:
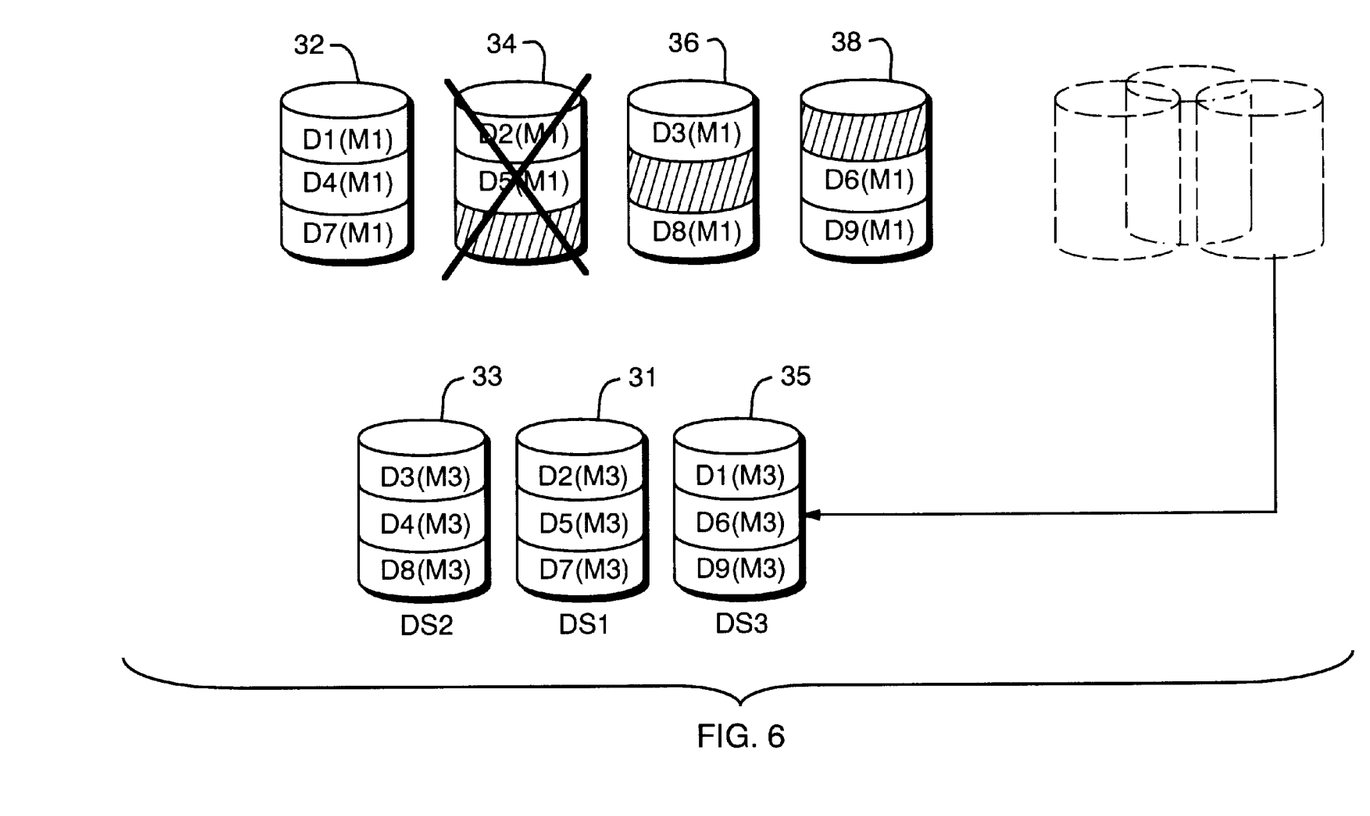
FIG. 6 is an illustration of the final configuration of for the storage devices of FIG. 3 after the dynamic sparing process of the present invention has completed.

By converting from a RAID protection scheme to a mirroring protection scheme in the event of a failure of one of the devices in storage system 14 as illustrated in FIG. 4 and FIG. 6, the storage system can fully tolerate the failure of a second or even third device in the system since, according to the present invention, a duplicate of all the data has been created after the failure of an individual device.

Figure 5:
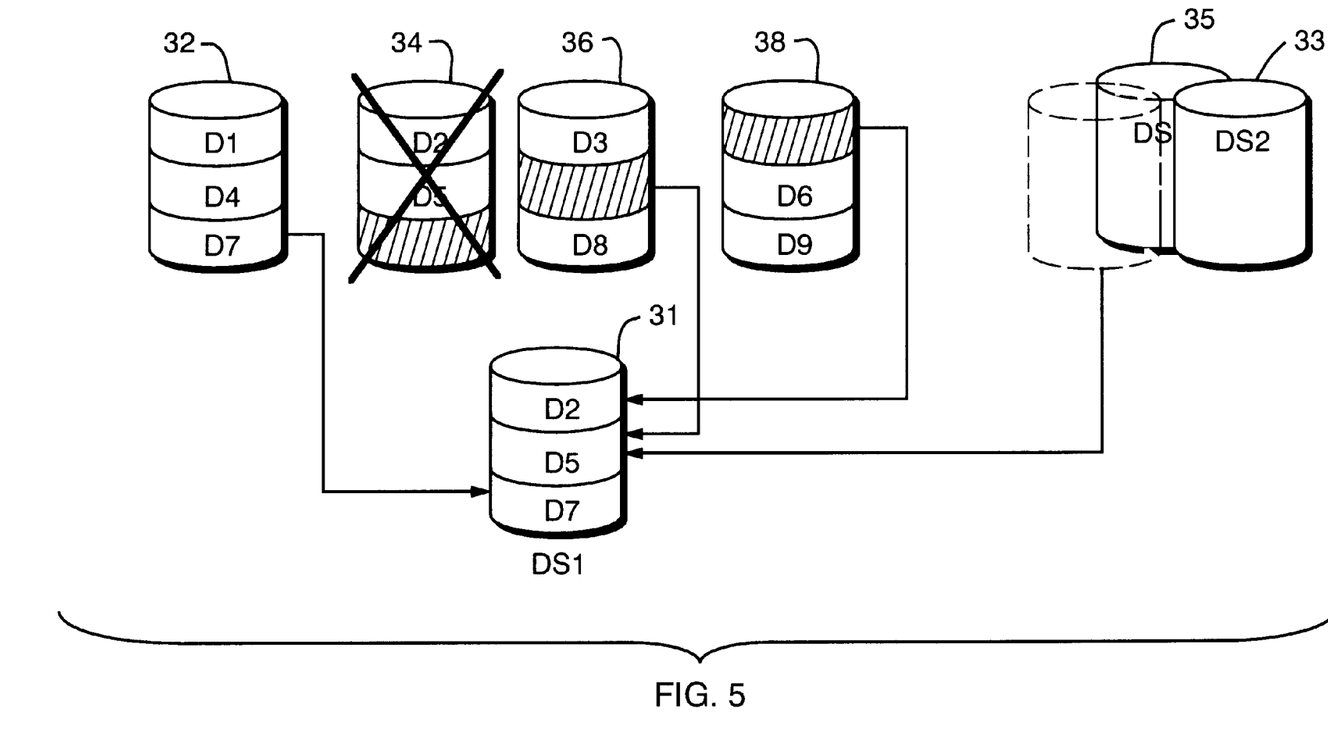
FIG. 5 is an illustration of the process for dynamic sparing for a failed device according to the present invention.

In accordance with another aspect of the present invention and referring now to FIG. 5, a condition is pictured wherein device 34 has failed completely before data from volumes D2 and D5 can be copied to either the spare device or the parity volumes of the remaining devices. According to the invention when this condition occurs, the data corresponding to the data stored in logical volume D2 of device 34 will here be reconstructed using the data on logical volume D1 of device 32 in combination with the data in logical volume D3 of device 36 and the parity information stored in the parity volume of device 38. As the data is reconstructed using the non-failed devices 32 and 36 in combination with the parity device 38, the information will be written to both the parity volume of device 38 as well as to the spare device 31. Simultaneously, the remaining data stored in the logical volumes of the non-failing devices will be written to spare devices 33 and 35. When the reconstruction/copy operation is complete, the storage system will have undergone a conversion from a RAID configuration as shown in FIG. 3 to a mirror configuration as shown in FIG. 6.

Referring now to FIG. 6, the resultant storage configuration, after the failure of a single device within a group of devices making up a RAID array, is shown to include devices 32, 36 and 38 as well as spare devices 31, 33 and 35. As shown, data from logical volume D2 of device 34 has replaced the parity data previously stored on device 38. Similarly, data from logical volume D5 of device 34 has replaced the parity volume of device 36. The result is that within devices 32, 36 and 38 all of the data previously stored on device 32, 34 36 and 38 is still available for reading and writing in storage system 14. However the configuration shown in FIG. 6 is no longer a RAID configuration since no parity information corresponding to the data in the devices is being stored. Instead, a complete duplicate of each logical volume is maintained in spare devices 31, 33 and 35. The configuration in FIG. 6 may remain until the device 34 can be replaced and the data re-written to the appropriate logical volumes. Once the data has been written to the replacement drive and the parity regenerated for all of the logical volumes and RAID groupings in the system, spare device 31, 33 and 35 may be returned to an inactive spare state. That is, the system may be returned to the configuration as shown in FIG. 3. Thus a storage system according to the present invention may operate normally in a RAID configuration. In the event of a failure of one of the devices, the system, without interrupting storage services, is reconfigured as a mirrored system. Thus, further device failures may be tolerated without disrupting storage services. Once the failed device is replaced, the system may be reconfigured as a RAID configuration without disrupting storage services.

The reconfiguration may be achieved by sending a signal to the disk controllers of storage system 14 informing them that the data destined for and stored in the failed volumes is to be stored and retrieved from the volumes previously designated as parity volumes. Additionally, the storage system will enable to controllers associated with the spare devices to send copies of the data, destined for the active devices, to be written to corresponding volumes on the spare devices. The disk controllers will also, in response to the reconfiguration signal, cease writing parity information to the previously identified parity volumes. Similarly, when the failed device is replaced, the controllers will receive a signal which will cause the controllers to resume reading and writing data for a RAID configuration.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A method of operating a storage system wherein said storage system includes a plurality of disk devices arranged in a redundant array of independent disks (RAID) configuration comprising a plurality of data groups and where a data group includes data storage within all but one of said disk devices and where said one storage device is used to store parity information corresponding to said data storage of said group, and the parity information for all the groups is not stored in the same disk device, said method comprising the steps of:

providing a number of spare disk devices equal to one less than the number of said plurality of disk devices within said RAID configuration;

monitoring operations of each of said disk devices; and in the event one of said disk devices begins to show signs of failure, selecting one of said spare disk devices;

simultaneous with normal operation of said storage system, copying data portion of said failing disk device to said selected spare disk, copying data portion of a non-failing disk device to said selected spare disk device, copying remaining data portions of non-failing disk devices to remaining ones of said spare disk devices:

operating said storage systems as a RAID storage system;

mirroring each write transaction to said disk devices to corresponding ones of said spare disk devices.

2. The method according to claim 1 further comprising the steps of:

placing said failing disk device in a write-disable state;

redirecting write data destined for a data volume within said failing device to a corresponding parity volume within a non-failing device.

3. The method of claim 1 wherein said copying of data portions of said failing disk to said selected spare device is accomplished by reconstructing said data of said failing disk from said data on said non-failing disks in conjunction with said corresponding parity data.

4. A method of operating a storage system wherein said storage system includes a plurality of disk devices arranged in a redundant array of independent disks (RAID) configuration comprising a plurality of data groups and where a data group includes data storage within all but one of said disk devices and where said one storage device is used to store parity information corresponding to said storage of said group, said method comprising the steps of:

providing a number of spare disk devices equal to a number of said disk devices within said RAID configuration defined for data storage;

monitoring operations of each of said disk devices; and in the event one of said disk devices begins to show signs of failure, selecting one of said spare disk devices;

simultaneous with normal operation of said storage system, copying data portions of said failing disk device to said selected spare disk, copying a data portion of a non-failing disk device to said selected spare disk device, copying remaining data portions of non-failing disk devices to remaining ones of said spare disk devices; operating said storage system as a RAID storage system; mirroring each write transaction to said disk devices to corresponding ones of said spare disk devices, placing said failing disk device in a write-disable state;

redirecting write data destined for a data volume within said failure device to a corresponding parity volume within a non-failure device;

removing said failed disk device from an active duty state; and operating said storage system without parity information.

5. The method of claim 4 wherein said removing step includes responding to requests for data stored on said failed device by servicing said request from data copied to said parity portion of a corresponding data group.

6. The method of claim 4 further including maintaining a mirror copy of each of said disk devices and not maintaining any parity information for said disk devices.

7. The method of claim 6 further including the steps of:

replacing said failed device;

copying said data copied to said parity portion of a corresponding data group to a corresponding data portion of said replacement device;

returning said spare devices to a standby state;

operating said storage system in according to said RAID configuration.

8. In the storage system having at least one redundancy group comprising a plurality of storage devices wherein at least one of said storage devices has a volume of parity information derived from corresponding data volumes in the other storage devices within redundancy group, a method comprising the steps of:

determining that one of the storage devices storing a data volume is operating anomalously;

transferring said data volume of said anomalously operating storage device to said parity volume to convert said parity volume to a data volume thereby leaving said redundancy group without any parity volume; and transferring the data volumes in said group of storage devices other than said anomalously operating storage device to respective spare storage devices to mirror the data in said redundancy group.

9. The method recited in claim 8 wherein each of said storage devices in said redundancy group has a plurality of volumes each corresponding to volumes in the other storage devices of the group, and one storage device in the group has a parity volume for the corresponding data volumes in the other storage devices in the group, and wherein, when anomalous operation is determined for one storage device in the group, data volumes in the anomalously operating storage device are transferred to corresponding parity volumes in the other storage devices in the group to convert them to data volumes thereby leaving corresponding volumes within said group of storage devices without a corresponding parity volume.

10. A storage system comprising:
- at least one redundancy group comprising a plurality of storage devices wherein at least one of said storage devices has a volume of parity information derived from corresponding data volumes in the other storage devices within the redundancy group;
- spare storage devices which number at least one less than the number of storage devices within the redundancy group;
- means for determining that one of the storage devices within the redundancy group is of failure prone;
- means responsive to said determining means for transferring the corresponding data volume within said failure prone storage device to said parity volume to convert said parity volume to a data volume thereby leaving said corresponding volumes within said group without a parity volume; and
- means for transferring the data volumes in said group of storage devices other than said failure prone storage device to respective spare storage devices to mirror the data in said redundancy group.

* * * * *